C. BOYER.
Churn.
No. 69,620.
Patented Oct. 8, 1867.
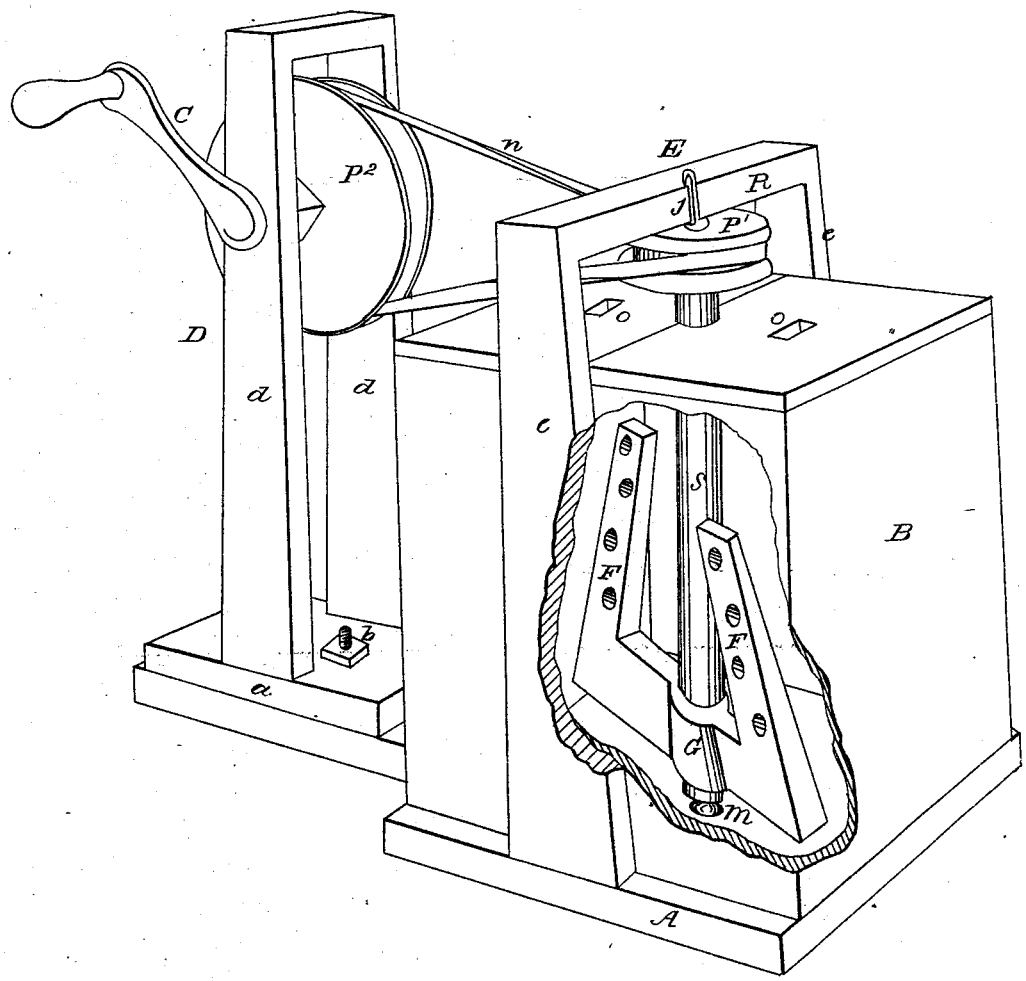
Witnesses:
S. E. Robinson
Otto L. Johnston
Inventor:
Courtland Boyer

United States Patent Office.

COURTLAND BOYER, OF MARSHALL, MICHIGAN.

*Letters Patent No. 69,620, dated October 8, 1867.*

---

IMPROVEMENT IN CHURNS.

---

*The Schedule referred to in these Letters Patent and making part of the same.*

---

TO ALL WHOM IT MAY CONCERN:

Be it known that I, COURTLAND BOYER, of the city of Marshall, in the county of Calhoun, and State of Michigan, have invented a new and useful Improvement in Butter-Churns; and I do hereby declare that the following is a full, clear, and exact description of the same, reference being had to the drawings hereunto annexed, making a part of this specification, in which is exhibited a perspective view of the churn, with sides of box partially broken away to show the dasher.

My invention relates to the arrangement of an adjustable pulley-hanger, with a stationary gallows-frame, enclosing a detachable churn-box, all on the same platform; also to a modification of the churn-dasher in such manner as will be fully shown and described, whereby said dasher can be rotated in a square box to great advantage; and to enable others skilled in the art to fully understand and construct my invention, I will proceed to describe it.

A represents a platform intended to rest on the floor, one portion of which is square, and of a size corresponding with the cream-box B, which is placed upon it. The other portion is narrower, and extends beyond the box a proper distance to receive an adjustable platform, $a$, in which are framed two standards, $d$, connected at the top. These two standards and platform constitute what I call the adjustable pulley-hanger, designated by the letter D. The churn-box is steadied in its place on the platform A partly by a strip or strips (not seen) nailed thereon, and partly by being fitted snugly inside of a gallows-frame, E, the two standards of which, indicated at $e$, are attached to the platform on which the box rests, and the rail R, connecting said standards at the top, has a half bearing to receive the upper journal $j$ of the dasher-shaft S. The upper end of said shaft is furnished with a grooved pulley, $P^1$, and the lower end is stepped on a conical step, $m$, in the centre of the box-bottom. The dasher is driven by an elastic cord or band, $n$, from a large pulley, $P^2$, hung between the standards $d$, which, by slotting the hole or holes of one or more bolts, $b$, which secure it to the bottom platform, can be readily adjusted, so that the driving-cord may be kept at a proper degree of tension. I construct the dasher with two or more perforated slats, F, attached to the twisted cross-bar G, which is secured at the bottom of the dasher-shaft. I attach these slats so that their edges will stand in a vertical plane, but their perforated faces are inclined forward, in the direction of the current, somewhere from ten to fifteen degrees, to produce the best effect; but I do not desire to be confined precisely to any specified angle of inclination, as a dasher may be operated at a less or greater angle with measurable advantage. The lid of the churn-box is in two halves, and rabbeted to make a close fit in the box, each half having an air-opening, $o$, covered below by a tin arch, so as to prevent splashing, without interfering with a free admission and circulation of air.

The cream at a proper temperature having been placed in the box, the operator, by means of the crank C, on the driving-pulley shaft, rotates the dasher, driving the body of the cream around the box in a circular current, and the agitation and friction produced by the rotating perforated slats soon produces the butter. The result is much hastened by the form of the box, in connection with the angular set of the slats F tending to neutralize the surging effect of centrifugal force, and converting the sides of the box, which are tangential to the cream current, into very effective "breakers," for separating the globular particles of butter from the cream. As soon as the butter is fully formed the operator throws off the cord or belt from the driving-pulley, and removes the churn-box from its place, where the subsequent operations can be most conveniently performed, and where the main apparatus, consisting only of an open square box, and a churn-dasher of the simplest form, can be readily and thoroughly cleaned and scalded.

I thus effect, by a simple noiseless arrangement of a few inexpensive parts, results which have hitherto been produced by only a few expensive and complicated churns, many of which have the great drawback of being very difficult to keep clean and sweet.

Having described my invention, what I claim, and desire to secure by Letters Patent, is—

A churn-dasher with inclined perforated slats F, operated in connection and combination with a churn-box, B, substantially in the manner and for the uses set forth.

COURTLAND BOYER.

Witnesses:
J. E. ROBINSON,
OTTO L. JOHNSON.